3,150,150
PREPARATION OF DELTA COPPER
PHTHALOCYANINE
Boris Peter Brand, Manchester, England, assignor to Imperial Chemical Industries Limited, London, England, a corporation of Great Britain
No Drawing. Filed Feb. 10, 1961, Ser. No. 88,266
Claims priority, application Great Britain, Feb. 19, 1960, 5,936/60
2 Claims. (Cl. 260—314.5)

This invention relates to copper phthalocyanine pigments, and more specifically it relates to a novel crystal form of copper phthalocyanines.

It is known that copper phthalocyanine may be obtained in three different crystal forms which are characterisable by their different X-ray diffraction spectra. The X-ray diffraction spectra of the alpha- and beta-crystal forms of copper phthalocyanine are described in United States Patent No. 2,486,351 and that of the gamma-crystal form is described in United States Patent No. 2,770,629. Of the three known crystal forms of copper phthalocyanine, the alpha-crystal form has the reddest shade. The beta-form is more stable to crystal growth in aromatic solvents than the alpha- and gamma-forms and is therefore more suitable for incorporation into coating compositions containing these solvents whenever it is necessary to store the compositions for a prolonged period before use. The alpha- and beta-crystal forms of copper phthalocyanine when reduced to a finely divided condition are used commercially as pigments, but the gamma-crystal form is not used commercially.

I have now discovered that copper phthalocyanine may be obtained in a novel fourth crystal form to which I have applied the prefix "delta-." The delta-crystal form of copper phthalocyanine is characterised by an X-ray diffraction spectrum which is different from that of the alpha-, beta- or gamma-crystal forms.

The X-ray diffraction spectra of phthalocyanine pigments contain a very large number of spectral lines. Goniometers now available enable the X-ray spectra of the known crystal forms of phthalocyanine pigments to be examined in greater detail than hitherto, and we find that the published information does not fully describe the spectra of the alpha- and beta-crystal forms of copper phthalocyanine. In particular we find that the X-ray spectrum of the alpha-crystal form of copper phthalocyanine contains two intense lines close together corresponding to interplanar spacings of 5.7 and 5.45 Angstrom units, and similarly the X-ray spectrum of the beta- crystal form of copper phthalocyanine contains two intense lines close together, corresponding to interplanar spacings of 4.9 and 4.8 Angstrom units. Using the same instrument we find that the gamma-crystal form of copper phthalocyanine described in United States Patent No. 2,770,629 gives an X-ray diffraction spectrum exhibiting a single weak spectral line corresponding to an interplanar spacing of 5.5 Angstrom units.

The novel delta-crystal form of copper phthalocyanine of my invention may readily be differentiated from the known crystal forms by examination of that portion of its X-ray diffraction spectrum lying between about 4.5 and 6.0 Angstrom units since in this region it contains only one line of any considerable intensity, namely at from 5.0 to 5.05 Angstrom units.

The novel delta-crystal form of copper phthalocyanine may be characterised in this X-ray diffraction spectrum and it may be further characterised by its pronounced redness of shade as compared with the previously known crystal forms, and by the fine needle-like appearance of its crystals.

According to our invention therefore, we provide the delta-crystal form of copper phthalocyanine.

The X-ray diffraction spectrum of the novel delta-crystal form of copper phthalocyanine also contains intense lines corresponding to interplanar spacings of about 11.5, 8.75, 7.5, 3.78 and 3.51 Angstrom units, and a line of medium strength corresponding to an interplanar spacing of 7.5 Angstrom units.

According to a further feature of my invention I provide a process for the manufacture of copper phthalocyanine in the novel delta-crystal form which comprises treating a finely divided copper phthalocyanine in alpha-crystal form with a water-immiscible organic liquid in the presence of a surface active agent and optionally in the presence of water.

In order to ensure that the alpha form is substantially completely converted to the delta form it is preferred to continue the treatment with the organic liquid and surface active agent for at least 5 hours and in practice a period of at 24 to 48 hours is usually required.

As an organic liquid it is preferred to use a hydrocarbon solvent, for example cyclo-1:3-hexadiene and especially benzene.

As examples of surface active agents which may be used in the process of the invention there may be mentioned sulphated or sulphonated derivatives of unsaturated products such as methyl oleate and castor oil, and polyethenoxy derivatives of alcohols and phenols such as cetyl alcohol and p-cresol. I prefer to use Turkey red oil (sulphated castor oil) as surface active agent since the transformation into delta-crystal form then proceeds more rapidly than it does when other surface active agents are used.

It will be understood that the copper phthalocyanine used in the process of our invention may contain minor quantities of substituted copper phthalocyanine for example halogeno-phthalocyanines or sulphonated phthalocyanines. The finely divided copper phthalocyanine in alpha-crystal form may be obtained in any known manner, for example by acid-pasting.

The process of the invention may be carried out by suspending finely powdered copper phthalocyanine in alpha-crystal form in a mixture of the organic liquid and surface active agent and allowing the suspension to stand until the transformation into delta-crystal form is complete. When the process is carried out in this way, transformation into delta-crystal form is slow, and it is usually necessary to allow the suspension to stand for several days. Alternatively an aqueous paste of finely divided copper phthalocyanine in alpha-crystal form (such as may be obtained, for example, by acid-pasting, filtering and washing) may be mixed with the organic liquid and surface-active agent. In this case the presence of at least sufficient sulphuric acid to provide a normal aqueous solution thereof is generally beneficial since this appears to accelerate the transformation into delta-crystal form.

It is preferred to carry out the process of invention by dissolving copper phthalocyanine (which may, if desired be in the alpha-, beta- or gamma-crystal form) in sulphuric acid and adding the solution to a stirred mixture of water, water-immiscible organic liquid and surface active agent. Suitable mixtures may contain for example between 0.1 and 10 parts by weight of organic liquid to each part by weight of water, and between 0.05 and 0.15 part of surface active agent to each part by weight of the organic liquid-water mixture. A finely divided precipitate of the phthalocyanine in alpha-crystal form in an aqueous emulsion is thereby produced and when stirred for a short period of time (usually about 3 to 10 minutes) the emulsion separates into two layers with the phthalocyanine in suspension in the non-aqueous layer. The mixture may then be allowed to stand at atmospheric temperature for a prolonged period, the length of time required to transform the phthalocyanine alpha-crystal form into the delta-form depending upon the nature of the surface active agent and the solvent used in the original emulsion. If desired, the transformation into delta-crystal form may be accelerated by raising the temperature, for example to 45° C., but at 55° C. some of the phthalocyanine is transformed into the beta-crystal form. When most of the alpha-crystal form has been transformed into delta-crystal form, however, the transformation may often be completed at still higher temperatures, for example at the boiling point of the organic solvent.

After carrying out the process of the invention the copper phthalocyanine in delta-crystal form may be filtered off (after removal of the organic solvent by steam distillation if desired), washed free of acid and dried. When the product is completely free of sulphuric acid its gives an X-ray diffraction spectrum exhibiting a strong line at 5.05 Angstrom units and a much weaker line at 5.0 Angstrom units. When the product is dried without being washed completely free of sulphuric acid it may exhibit in its X-ray diffraction spectrum only a strong line at 5.0 Angstrom units. Degrees of washing intermediate between the two extremes may lead to a product exhibiting two lines of almost equal intensity at 5.0 and 5.05 Angstrom units.

Although the products obtained by the process of the invention are already finely divided, and therefore suitable for use as pigments without further treatment, the particle size may be further reduced if desired, for example by grinding.

Copper phthalocyanine in delta-crystal form is of especial value as a pigment when obtained as a powder or paste of surface area greater than 50 square metres per gram of dry pigment, and such a powder forms a further feature of my invention.

Copper phthalocyanine in the novel delta-crystal form is very much redder in shade than any of the previously known crystal forms. It is therefore valuable for the colouration of paints, including water-emulsion paints, lithographic varnishes, printing inks and artificial polymeric materials such as cellulose acetate, polyvinyl chloride and polystyrene. It is also of value for colouring fibre forming materials such as viscose before spinning.

The invention is illustrated but not limited by the following example in which the parts are by weight.

*Example 1*

25 parts of copper phthalocyanine are dissolved in 250 parts of 98% sulphuric acid and the solution is added, during 30 minutes, to a stirred emulsion of 440 parts of benzene in 800 parts of water containing 5 parts of Turkey red oil at 20° C. During the addition the temperature is allowed to rise from about 20° C. to about 38° C. The emulsion separates into 2 layers and the precipitated phthalocyanine is in suspension in the benzene layer. The mixture is allowed to stand at atmospheric temperature for 48 hours and the solid is then filtered off, washed with alcohol and finally with water until free of acid, and then dried at 70° C.

The delta-crystal form copper phthalocyanine so obtained is considerably redder in shade than copper phthalocyanine in alpha-crystal form and when incorporated in printing inks, gives attractive reddish blue shades of excellent fastness properties.

The X-ray diffraction spectrum of the product contains intense lines corresponding to interplanar spacings of 11.5, 8.75, 3.78, 5.05 and 3.51 Angstrom units and a line of medium strength corresponding to an interplanar spacing of 7.5 Angstrom units.

The amount of benzene used in this example may be reduced to 110 parts without affecting the quality of the delta-crystal form copper phthalocyanine obtained. When the example is repeated using 44 parts of benzene, the product consists of a mixture of approximately equal proportions of the delta-crystal form and the alpha-crystal form. In place of Turkey red oil in this example there may be used one of the following:

Sulphonated methyl oleate,
The condensation product of p-octylphenol with 8 moles of ethylene oxide,
The condensation product of cetyl alcohol with 17 moles of ethylene oxide.

In each case, transformation into the delta-crystal form is slower than when Turkey red oil is used, and it is necessary to allow the mixture to stand for about 7 days, instead of 48 hours.

*Example 2*

In place of 440 parts of benzene in Example 1 there are used 440 parts of cyclo-1:3-hexadiene. The product is identical with that of Example 1.

*Example 3*

25 parts of copper phthalocyanine are dissolved in 250 parts of sulphuric acid and the solution is drowned into water, using the turbulent-flow method of drowning described in United States Patent No. 2,334,812. The precipitated copper phthalocyanine is filtered off, washed free of acid and the wet paste (125 parts) is stirred with 220 parts of benzene, 10 parts of Turkey red oil and 2 parts of concentrated sulphuric acid. The mixture is allowed to stand for 24 hours at 35° C. and the solid is filtered off, washed with alcohol and then with water until free of acid, and dried at 70° C.

The product is similar in appearance to that of Example 1, and is a mixture of the delta-crystal form of copper phthalocyanine with some residual alpha-crystal form.

If, in this example, the mixture after standing for 24 hours is boiled under reflux for 5 hours the product contains 95% of the delta-crystal form.

If desired, the benzene used in this example may be removed by steam distillation and the product isolated by filtration, washing and drying. The quality of the product is not affected by the steam distillation.

*Example 4*

In place of 2 parts of concentrated sulphuric acid in Example 3 there are used 20 parts of concentrated sulphuric acid, and in place of 220 parts of benzene there are used 50 parts of benzene. After filtration and washing, the wet paste of delta-crystal form copper phthalocyanine is milled with 5 parts of disodium dinaphthylmethane disulphonate until 90% of the particles are less than 1 micron in diameter. The resulting paste is suitable for incorporation in viscose before spinning and gives bright reddish blue shades of excellent fastness properties.

A sample of the delta-crystal form obtained as in this example was dried and gave an X-ray diffraction spectrum exhibiting a strong line at 5.0 Angstrom units, and also a weak line at 5.05 Angstrom units.

*Example 5*

25 parts of copper phthalocyanine are dissolved in 250 parts of concentrated sulphuric acid and the solution is drowned into 2,500 parts of ice-water. The precipitate is filtered off, washed completely free of acid, dried and suspended in a mixture of 440 parts of benzene and 5 parts of Turkey red oil at 20° C. The suspension is allowed to stand for 4 days and the solid is then filtered off, washed with alcohol, and finally with water and dried at 70° C. Delta-crystal form copper phthalocyanine is obtained, identical with the product of Example 1.

What I claim is:

1. A process for the manufacture of copper phthalocyanine in the delta-crystal form having an X-ray diffraction pattern exhibiting intense lines corresponding to interplanar spacings of about 11.5, 8.75, 7.5, 5.0 to 5.05, 3.78, and 3.51 Angstrom units and a line of medium strength corresponding to an interplanar spacing of 7.5 Angstrom units, which process comprises treating finely divided copper phthalocyanine in alpha-crystal form with water a surface active agent selected from the class consisting of sulphonated methyl oleate, sulphated castor oil, a polyethenoxy alcoholate, and a polyethenoxy phenolate and an organic liquid selected from the class consisting of benzene and cyclo-1:3-hexadiene at a temperature below about 55° C.

2. The process of claim 1, wherein said copper phthalocyanine in alpha-crystal form is treated with Turkey red oil, water and benzene.

References Cited in the file of this patent

UNITED STATES PATENTS

| | | |
|---|---|---|
| 2,699,444 | Eastes et al. | Jan. 11, 1955 |
| 3,051,721 | Pfeiffer | Aug. 28, 1962 |

OTHER REFERENCES

Buckley: Crystal Growth, Wiley and Sons, New York (1951), pages 344 and 345.

Weissberger: (Ed.) Technique of Org. Chem., Interscience Pubs. Inc., New York, vol. III (1950), pages 384–387.

Suito et al.: Proc. Japanese Acad., vol. 33 (1957), pages 398–402.